(12) United States Patent  
Kim et al.

(10) Patent No.: US 9,274,216 B2
(45) Date of Patent: Mar. 1, 2016

(54) RADAR APPARATUS AND AN ANTENNA APPARATUS

(71) Applicant: MANDO CORPORATION, Pyeongtaek-si, Gyeonggi-do (KR)

(72) Inventors: Su Han Kim, Seongnam-si (KR); Sung Joon Heo, Seoul (KR); Hyung Suk Ham, Yongin-si (KR); Jong Gyu Park, Suwon-si (KR)

(73) Assignee: MANDO CORPORATION, Pyeongtaek-Si, Gyeongg-Do (KR)

( * ) Notice: Subject to any disclaimer, the term of this patent is extended or adjusted under 35 U.S.C. 154(b) by 428 days.

(21) Appl. No.: 13/890,581

(22) Filed: May 9, 2013

(65) Prior Publication Data
US 2013/0300606 A1    Nov. 14, 2013

(30) Foreign Application Priority Data

May 9, 2012    (KR) .................... 10-2012-0049101

(51) Int. Cl.
| | | |
|---|---|---|
| *G01S 1/00* | (2006.01) | |
| *G01S 13/02* | (2006.01) | |
| *H01Q 1/50* | (2006.01) | |
| *H01Q 21/29* | (2006.01) | |
| *G01S 7/03* | (2006.01) | |
| *G01S 13/87* | (2006.01) | |
| *H01Q 1/38* | (2006.01) | |
| *H01Q 3/28* | (2006.01) | |

(52) U.S. Cl.
CPC . *G01S 13/02* (2013.01); *G01S 7/03* (2013.01); *G01S 13/87* (2013.01); *H01Q 1/38* (2013.01); *H01Q 1/50* (2013.01); *H01Q 3/28* (2013.01); *H01Q 21/29* (2013.01); *G01S 2013/0245* (2013.01)

(58) Field of Classification Search
CPC ... G01S 1/00; G01S 2013/0245; H04B 7/185; H04B 7/10; H01Q 21/06; H01Q 21/24; H01Q 1/38; H01Q 3/28
USPC .......................................... 342/385, 354, 361
See application file for complete search history.

(56) References Cited

U.S. PATENT DOCUMENTS

| 6,452,550 | B1 | 9/2002 | Channabasappa et al. |
| 7,579,982 | B2 * | 8/2009 | Matsuoka ................. G01S 3/32 342/175 |
| 2005/0093743 | A1 | 5/2005 | Park et al. |
| 2006/0267830 | A1 * | 11/2006 | O'Boyle ................. G01S 7/414 342/70 |
| 2008/0150799 | A1 * | 6/2008 | Hemmi ................ H01Q 21/061 342/361 |

(Continued)

FOREIGN PATENT DOCUMENTS

| CN | 102288971 A | 12/2011 |
| DE | 10 2013 000 858 A1 | 7/2013 |
| EP | 0 978 729 A2 | 2/2000 |

(Continued)

OTHER PUBLICATIONS

Chinese Office Action dated Nov. 10, 2015 issued in Chinese Patent Application No. 201310166025.4.

*Primary Examiner* — Harry Liu
(74) *Attorney, Agent, or Firm* — McDermott Will & Emery LLP (57) ABSTRACT

The present invention relates to radar and antenna technique, and more particularly, to a radar apparatus and an antenna apparatus having antenna configuration of arranging a plurality of array antennas capable of concentrating antenna gain on a direction for sensing.

12 Claims, 5 Drawing Sheets

(56) References Cited

U.S. PATENT DOCUMENTS

| | | | |
|---|---|---|---|
| 2008/0258964 A1* | 10/2008 | Schoeberl | G01S 7/032 342/189 |
| 2009/0251357 A1* | 10/2009 | Margomenos | G01S 7/032 342/70 |
| 2012/0050091 A1 | 3/2012 | Inami et al. | |
| 2014/0070982 A1* | 3/2014 | Inada | B60R 19/483 342/188 |

FOREIGN PATENT DOCUMENTS

| | | |
|---|---|---|
| JP | 06-300834 A | 10/1994 |
| KR | 10-2005-0041243 A | 5/2005 |

* cited by examiner

RADAR APPARATUS AND AN ANTENNA APPARATUS

CROSS-REFERENCE TO RELATED APPLICATION

This application claims priority from and the benefit under 35 U.S.C. §119(a) of Korean Patent Application No. 10-2012-0049101, filed on May 9, 2012 which is hereby incorporated by reference for all purposes as if fully set forth herein.

BACKGROUND OF THE INVENTION

1. Field of the Invention

The present invention relates to a radar apparatus and an antenna apparatus.

2. Description of the Prior Art

A conventional radar apparatus utilizes an arrangement of a plurality of array antennas, and this causes a problem of dispersing antenna gain obtainable from the plurality of array antennas into various directions rather than concentrating on a direction for sensing. Moreover, this causes failure to sufficiently reducing a Side Lobe Level due to the dispersed antenna gain obtainable from the plurality of array antennas.

SUMMARY OF THE INVENTION

Accordingly, the present invention has been made to solve the above-mentioned problems occurring in the prior art, and an object of the present invention is to provide a radar apparatus and an antenna apparatus with an antenna arrangement of a plurality of array antennas such that antenna gain is to be focused on a direction for sensing.

Another object of the present invention is to provide a radar apparatus and an antenna apparatus with an antenna arrangement of a plurality of array antennas capable of effectively reducing a Side Lobe Level in horizontal direction of the plurality of array antennas.

In order to accomplish the above objects, there is provided a radar apparatus comprising an antenna unit having a long range transmission antenna unit with a plurality of long range transmission array antennas, a short range transmission antenna unit with one or more short range transmission array antenna and a reception antenna unit with a plurality of reception array antennas; and a signal transmission and reception unit for transmitting signal through at least one of the long range transmission antenna unit and the short range transmission antenna unit, and receiving echo signal of the transmitted signal reflected off surroundings through the reception antenna unit, wherein the long range transmission array antenna arranged in the middle of the plurality of long range transmission array antennas of the long range transmission antenna unit is the longest and the other long range transmission array antennas become shorter from the middle toward both sides.

The long range transmission antenna unit, the short range transmission antenna unit, the reception antenna unit and the signal transmission and reception unit may be mounted on one side of a printed circuit board.

A length of a first area on which the long range transmission antenna unit is to be mounted may be longer than lengths of a second area on which the short range transmission antenna unit is to be mounted, a third area on which the reception antenna unit is to be mounted and a fourth area on which the signal transmission and reception unit is to be mounted.

A protective member may be coupled to the top side of the printed circuit board to cover the signal transmission and reception unit for protecting the signal transmission and reception unit mounted on the printed circuit board.

The protective member has a size to cover only the fourth area of the printed circuit board on which the signal transmission and reception unit is mounted.

The antenna unit may include a power divider for controlling power to be supplied to each of the plurality of the long range transmission array antennas and the one or more short range transmission array antenna.

The power divider may control power to supply highest power to the long range transmission array antenna positioned on the middle of the plurality of the long range transmission array antennas and to reduce power supply decreasingly from the middle toward the sides.

In accordance with another aspect of the present invention, there is provided an antenna apparatus comprising a plurality of array antennas, wherein the array antenna arranged in the middle of the plurality of the array antennas is the longest and the other array antennas become shorter from the middle toward both sides.

The antenna apparatus may further include a power divider for controlling power to be supplied to each of the plurality of the array antennas.

The power divider may control power to supply highest power to the array antenna positioned on the middle of the plurality of the array antennas and to reduce power supply decreasingly from the middle toward the sides.

As described above, according to the present invention, it is possible to provide a radar apparatus and an antenna apparatus having antenna configuration arranging a plurality of array antennas capable of concentrating antenna gain on a direction for sensing.

In addition, according to the present invention, it is possible to provide a radar apparatus and an antenna apparatus 500 having antenna configuration arranging a plurality of array antennas capable of effectively reducing a side lobe level in horizontal direction of the plurality of array antennas.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
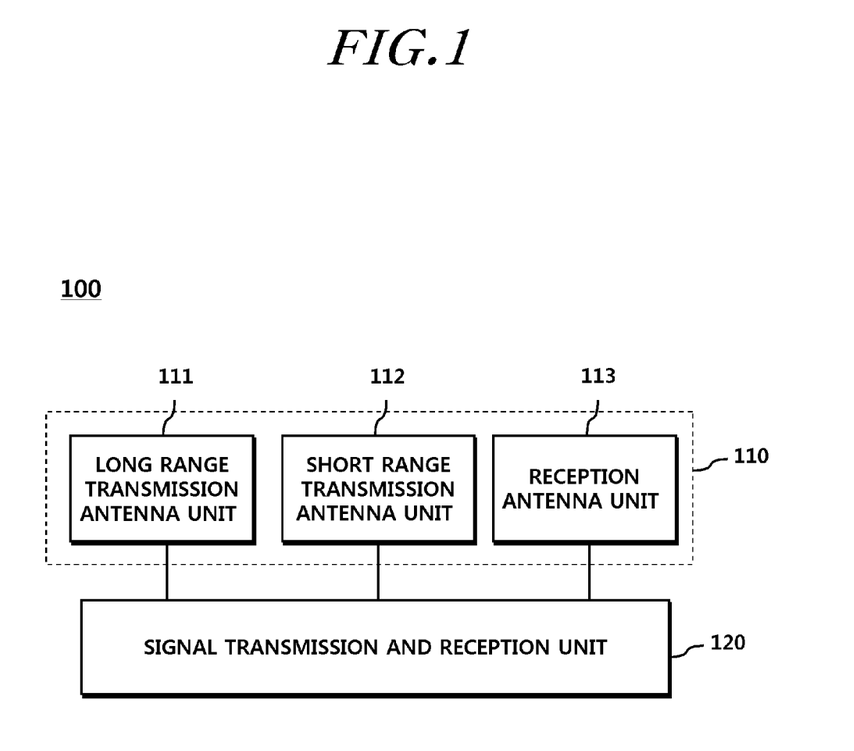
FIG. 1 is a block diagram of a radar apparatus according to an exemplary embodiment of the present invention.

FIG. 1 is a block diagram of a radar apparatus 100 according to an exemplary embodiment of the present invention.

Referring to FIG. 1, the radar apparatus 100 according to the exemplary embodiment of the present invention includes an antenna unit 110 for transmitting signals to sense surroundings and receiving echo signal of the transmitted signal reflected off the surroundings, and a signal transmission and reception unit 120 for transmitting and receiving the signals through the antenna unit 110.

The antenna unit 110 includes a long range transmission antenna unit 111 having a plurality of long range transmission array antennas, a short range transmission antenna unit 112 having one or more short range transmission array antenna, and a reception antenna unit 113 having a plurality of reception array antennas.

The signal transmission and reception unit 120 transmits signal through at least one of the long range transmission antenna unit and the short range transmission antenna unit, and receives echo signal of the transmitted signal reflected off the surroundings through the reception antenna unit.

The long range transmission array antenna unit 111 of the antenna unit 110 may include a plurality of long range transmission array antennas having the configuration such that the long range transmission array antenna arranged in the middle of the plurality of the long range transmission array antennas is the longest and the other long range transmission array antennas of the plurality of the long range transmission array antennas become shorter from the middle toward both sides.

This configuration of the antenna may concentrate antenna gain on a direction for sensing and effectively reduce a side lobe level of the horizontal direction of the antenna. Eventually, this configuration of the antenna may improve a sensing performance of the radar apparatus 100.

The radar apparatus 100 according to the exemplary embodiment of the present invention may further include a power divider for controlling power to be supplied to each of the plurality of the long range transmission array antennas and the one or more short range transmission array antenna.

The power divider may control power to supply highest power to the long range transmission array antenna positioned on the middle of the plurality of the long range transmission array antennas and to reduce power supply decreasingly from the middle toward the sides.

The antenna unit 110 and the signal transmission and reception unit 120 may be mounted together on a printed circuit board. That is, the long range transmission antenna 111, the short range transmission antenna 112, the reception antenna 113 and the signal transmission and reception antenna 120 may be mounted on one side of the printed circuit board.

The antenna unit 110 and the signal transmission and reception unit 120 both mounted on the printed circuit board will be described with reference to FIG. 2.

Figure 2:
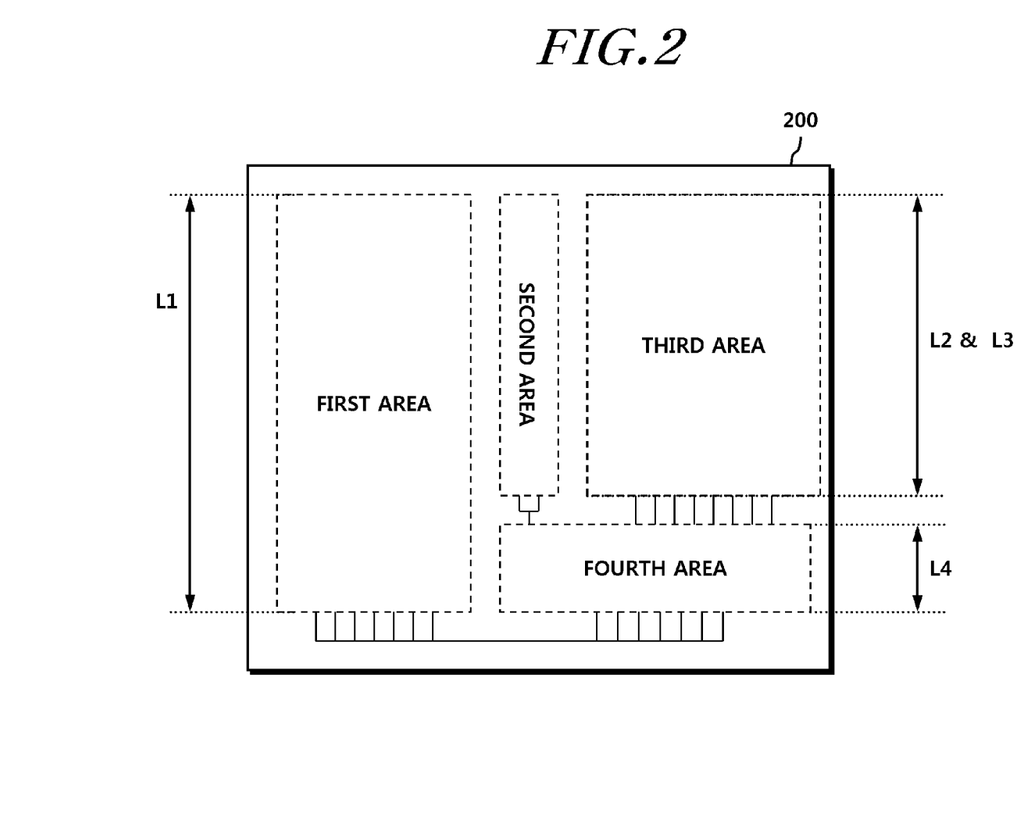
FIG. 2 is a view showing a side of a printed circuit board on which both of an antenna unit and a signal transmission and reception unit of the radar apparatus of the exemplary embodiment of the present invention are mountable.

FIG. 2 is a view showing a side of the printed circuit board 200 mountable thereon both of the antenna unit 110 and the signal transmission and reception unit 120 of the radar apparatus 100 of the exemplary embodiment of the present invention.

Referring to FIG. 2, the side of the printed circuit board 200 includes a first area on which the long range transmission antenna unit 111 is to be mounted, a second area on which the short range transmission antenna unit 112 is to be mounted, a third area on which the reception antenna unit 113 is to be mounted and a fourth area on which the signal transmission and reception unit 120 is to be mounted.

To accomplish a long sensing distance by utilizing the long range transmission antenna unit 111 and to mount the antenna 110 and the signal transmission and reception unit 120, as shown in FIG. 2, a length L1 of the first area on which the long range transmission antenna unit 11 is to be mounted may be longer than a length L2 of the second area on which the short range transmission antenna unit 112 is to be mounted, a length L3 of the third area on which the reception antenna unit 113 is to be mounted and a length L4 of the fourth area on which the signal transmission and reception unit 120 is to be mounted.

Furthermore, a protective member (not shown) may be coupled to a top side of the printed circuit board 200 for covering the signal transmission and reception unit 120 to protect the signal transmission and reception unit 120 mounted on the printed circuit board 200.

The protective member may have a size to cover only the fourth area on which the signal transmission and reception unit 120 is mounted, to protect the signal transmission and reception unit 120 while preventing a disturbance of signal transmission and reception through the antenna unit 110.

The protective member may also be formed with a groove that serves as a passage of a wire for interconnecting the signal transmission and reception unit 120 with each of the long range transmission antenna unit 111, the short range transmission antenna unit 112 and the reception antenna unit 113.

The radar apparatus 100 may further include a switch for selecting one of the long range transmission antenna unit 111 and the short range transmission antenna unit 112 as an antenna for transmitting signal to selectively perform one of a long range sensing or a short range sensing.

The sensing distance is characterized by being proportional to a number of transmission array antennas and the sensing angle is characterized by being inversely proportional to the number of the transmission array antennas.

In connection with this characteristics, the number of the plurality of the long range transmission array antennas may be determined to be proportional to a sensing distance value of a designed predetermined long sensing range, and the number of the one or more short range transmission antenna may be determined to be proportional to a sensing distance of a designed predetermined short sensing range. Therefore, the number of the plurality of long range transmission array antennas may be determined to be larger than the number of the one or more short range array antenna since the sensing distance of the long sensing range is longer than the sensing distance of the short sensing range.

Furthermore, a number of the plurality of the long range transmission array antennas may be determined to be inversely proportional to a sensing angle of a designed predetermined long sensing range and a number of the one or more short range transmission antenna may be determined to be inversely proportional to a sensing angle of a designed predetermined short sensing range. Therefore, the number of the plurality of the long range transmission array antennas may be determined to be larger than the number of the one or more short range array antenna if the sensing angle of the long sensing range is narrower than the sensing angle of the short sensing range.

Figure 3:
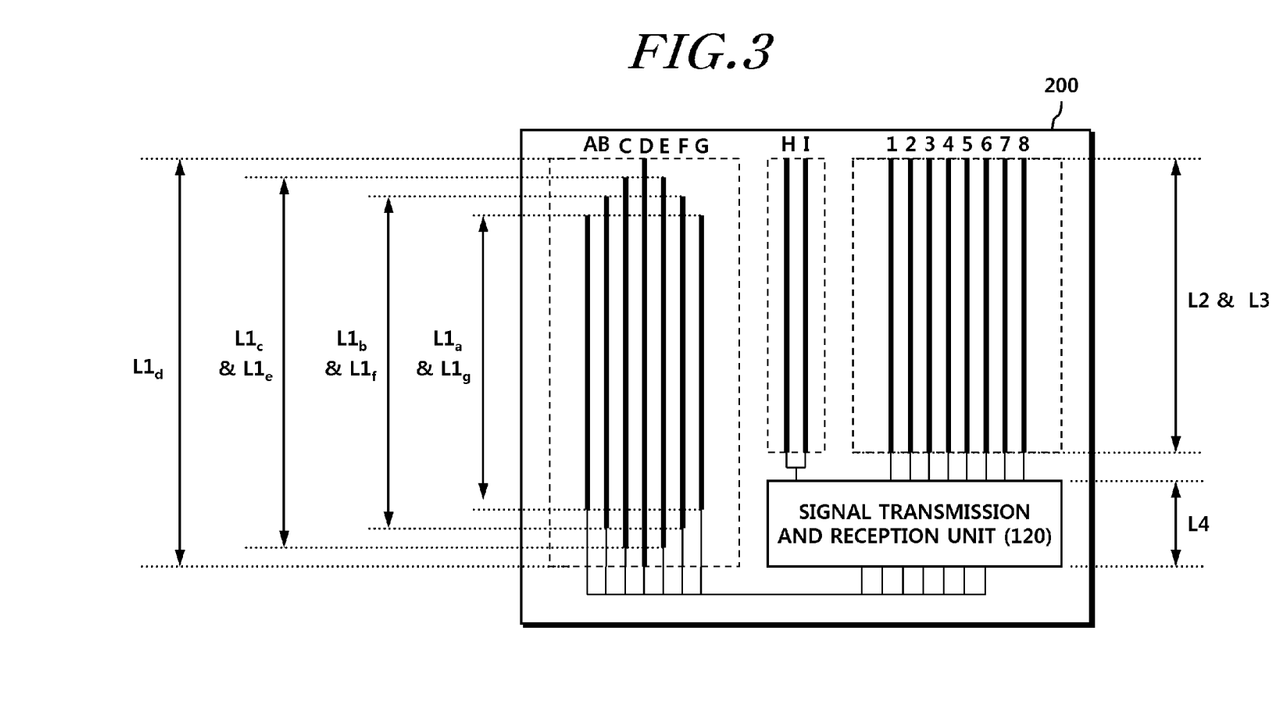
FIG. 3 is a view showing an example of a side of a printed circuit board on which a long range transmission antenna unit, a short range transmission antenna unit, a reception antenna unit and a signal transmission and reception unit of the radar apparatus of the exemplary embodiment of the present invention are mounted.
Figure 4:
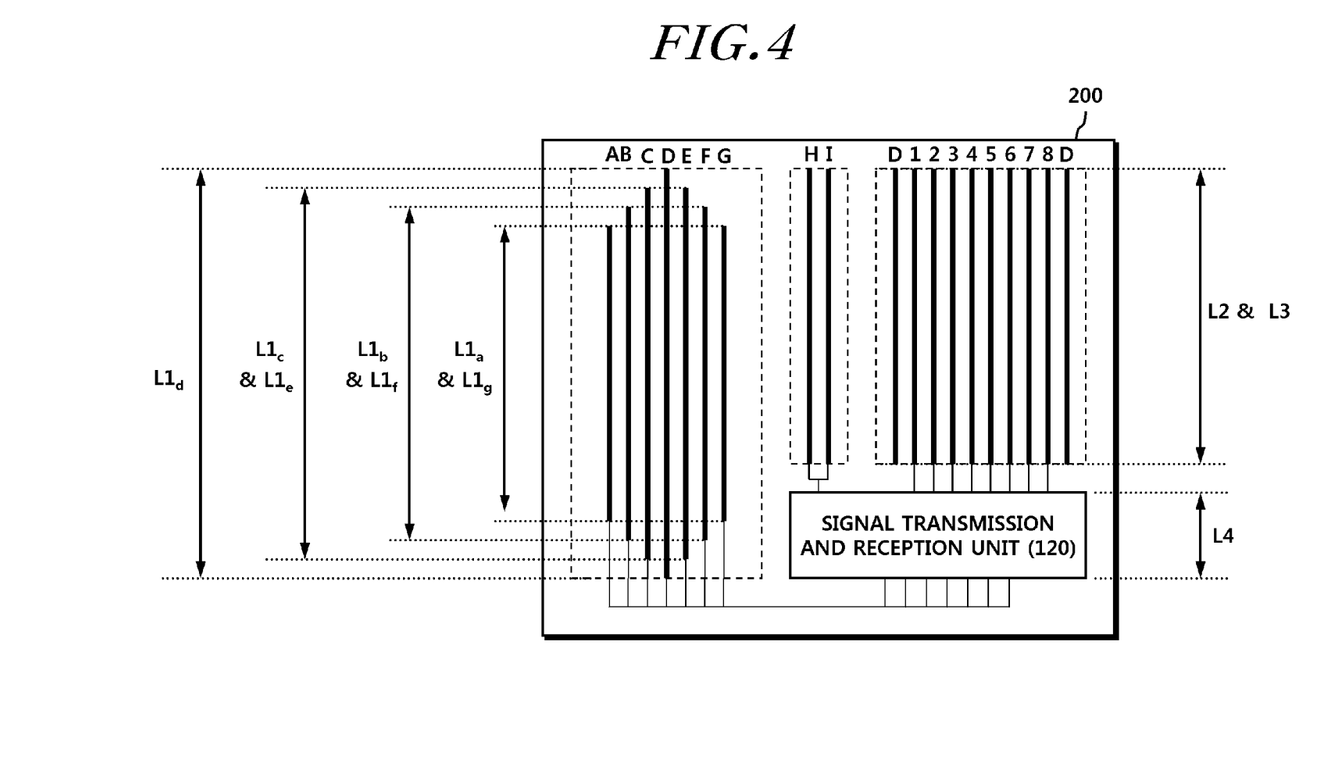
FIG. 4 is a view showing another example of a side of a printed circuit board on which a long range transmission antenna unit, a short range transmission antenna unit, a reception antenna unit and a signal transmission and reception unit of the radar apparatus of the exemplary embodiment of the present invention are mounted.

Examples of a printed circuit board 200 of FIG. 2 with a plurality of long range transmission array antennas, one or more short range transmission array antenna and a plurality of reception array antennas mounted thereon will be illustrated in FIGS. 3 and 4.

FIG. 3 is a view showing an example of a side of the printed circuit board 200 on which the long range transmission antenna unit 111, the short range transmission antenna unit 112, the reception antenna unit 113 and the signal transmission and reception unit 120 of the radar apparatus 100 of the exemplary embodiment of the present invention are mounted.

As shown in FIG. 3, the printed circuit board 200 have seven long range transmission array antennas a, b, c, d, e, f and g mounted on a first area thereof, two short range transmission array antennas h and i mounted on a second area thereof, and eight reception array antennas 1, 2, 3, 4, 5, 5, 7 and 8 mounted on a third area thereof.

Assume that lengths of the second area and the two short range transmission array antennas h and i are the same as L2, and lengths of the third area and the eight reception array antennas 1, 2, 3, 4, 5, 6, 7 and 8 are the same as L3. Further assume that a length of the fourth area on which the signal transmission and reception unit 120 is to be mounted is L4.

The length of the seven long range transmission array antennas a, b, c, d, e, f and g is longer that the length of the two short range transmission array antennas h and i for long sensing range.

To mount both the antenna unit 110 and the signal transmission and reception unit 120 on one side of the printed circuit board 200, they may have an arrangement as shown in FIG. 3.

As described above, the long range transmission antenna unit 111 may have the seven long range transmission array antennas with an antenna arrangement that a length $L1_d$ of the long range transmission array antenna d arranged in the middle of the seven long range transmission array antennas is the longest and the other long range transmission array antennas become shorter from the middle toward both sides.

In more detail, referring to FIG. 3, assume that the length of the long range transmission array antenna d arranged in the middle of the seven long range transmission array antennas is $L1_d$, a length of the long range transmission antenna c is $L1_c$ and a length of the long range transmission antenna e is $L1_e$. Further assume that a length of the long range transmission antenna b is $L1_b$, a length of the long range transmission antenna f is $L1_f$, a length of the long range transmission antenna a is $L1_a$ and a length of the long range transmission antenna g is $L1_g$. Then, the relations of the antenna lengths are as follows:

$$L1_d > L1_c = L1_e > L1_b = L1_f > L1_a = L1_g$$

According to this antenna arrangement, antenna gain may be concentrated on a direction for sensing, and a Side Lobe Level may be effectively reduced in horizontal direction of the plurality of array antennas. Therefore, this antenna arrangement may greatly improve sensing performance of the radar apparatus 100.

The power divider may be installed inner or outer part of the antenna unit 110 of the radar apparatus 100 according to the exemplary embodiment of the present invention. The power divider may control power to be supplied to each of the seven long range transmission array antennas a, b, c, d, e, f and g and the two short range transmission array antennas h and i.

The power divider may control power to supply highest power to the long range transmission array antenna d positioned on the middle of the plurality of the long range transmission array antennas a, b, c, d, e, f and g and to reduce power supply to the long range transmission array antennas decreasingly from the middle toward the sides.

In more detail, assume that the power supply to the long range transmission array antenna d arranged in the middle of the seven long range transmission array antennas is $P_d$, a power supply to the long range transmission antenna c is $P_c$ and a power supply to the long range transmission antenna e is $P_e$. Further assume that a power supply to the long range transmission antenna b is $P_b$, a power supply to the long range transmission antenna f is $P_f$, a power supply to the long range transmission antenna a is $P_a$ and a power supply to the long range transmission antenna g is $P_g$. Then, the relations of the power supply are as follows:

$$P_d > P_c = P_e > P_b = P_f > P_a = P_g$$

According to this power control, antenna gain may be concentrated on a direction for sensing, and a Side Lobe Level may be effectively reduced in horizontal direction of the plurality of array antennas. Therefore, this power control for the antenna arrangement may greatly improve sensing performance of the radar apparatus 100.

Meanwhile, beam patterns may become asymmetric due to coupling among the plurality of array antennas adopted for signal transmission and reception of the radar apparatus 100 according to exemplary embodiment of the present invention.

For example, referring to FIG. 3, each of the reception array antennas 1 and 8 has a neighboring reception array antenna in only one side thereof while the other reception array antennas 2, 3, 4, 5, 6 and 7 have neighboring reception array antennas in both sides thereof, therefore, beam patterns may be distorted in one direction and become asymmetric due to coupling between each of the reception array antennas 1 and 8 and the neighboring reception antenna in only one side thereof.

Dummy array antennas D may be arranged on both sides of the plurality of array antennas without electrically connected to the signal transmission and reception unit 120 to prevent the beam pattern distortion due to coupling among the plurality of array antennas included in at least one of the long range transmission antenna unit 111, the short range transmission antenna unit 112 and the reception antenna 113 of the radar apparatus 100 according to the exemplary embodiment of the present invention.

The configuration of dummy antenna added antenna arrangement will be described as an example with reference to FIG. 4. The configuration shown in FIG. 4 has two dummy antennas arranged on both sides of eight reception antennas 1, 2, 3, 4, 5, 6, 7 and 8.

FIG. 4 is a view showing another example of a side of the printed circuit board 200 on which the long range transmission antenna unit 111, the short range transmission antenna unit 112, the reception antenna unit 113 and the signal transmission and reception unit 120 of the radar apparatus 100 according to the exemplary embodiment of the present invention are mounted.

According to the configuration of dummy antenna added antenna arrangement as shown in FIG. 4, the reception array antenna 1, which has only one neighboring array antenna 2 only on its right side before arranging more dummy antenna, has now another neighboring array antenna, dummy antenna D, on its left side also. This makes beam pattern symmetric.

According to the configuration of dummy antenna added antenna arrangement as shown in FIG. 4, the reception array antenna 8, which has only one neighboring array antenna 7 only on its left side before arranging more dummy antenna, also has now another neighboring array antenna, dummy antenna D, on its right side too. This makes beam pattern symmetric.

The configuration of the antenna unit as described above has the longest long range transmission array antenna in its middle and the side long range transmission array antennas become decreasingly smaller from the middle toward the sides, and, differentiated power supply to each of the long range transmission array antennas according to this configuration. This configuration of the antenna unit may concentrate antenna gain on a direction for sensing and reduce a side lobe level effectively in horizontal direction of the antenna unit than the conventional antenna configuration with the same lengths of all long range transmission array antennas and without differentiated power supply control. That is, the sensing performance of the radar apparatus 100 may be greatly enhanced according to this antenna configuration and differentiated power supply control of the exemplary embodiment of the present invention.

Figure 5:
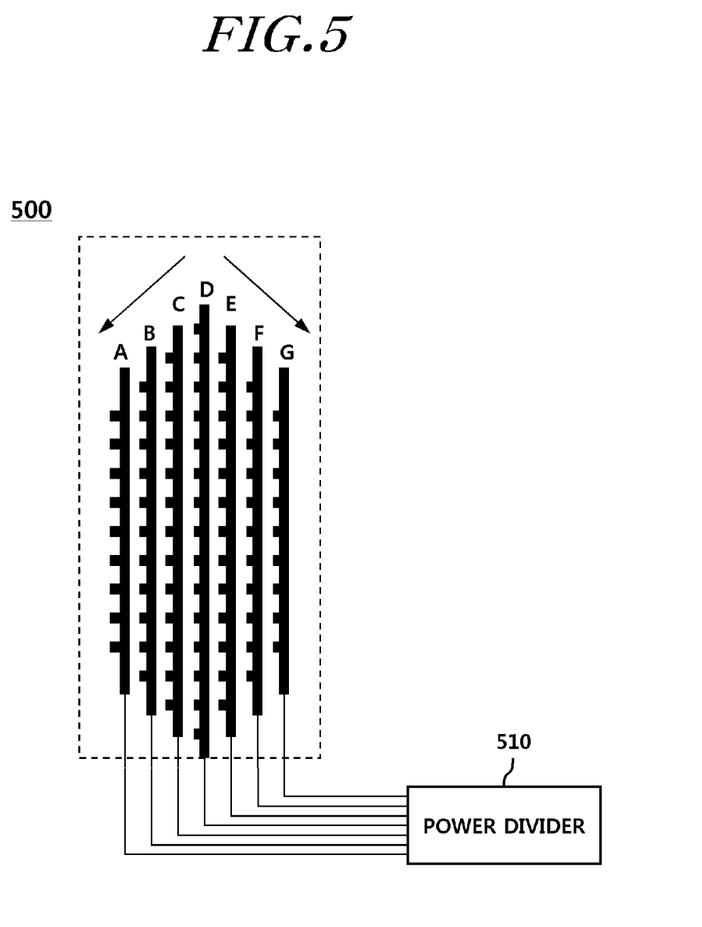
FIG. 5 is a view showing an antenna apparatus according to an exemplary embodiment of the present invention.

FIG. 5 is a view showing an antenna apparatus 500 according to an exemplary embodiment of the present invention.

Referring to FIG. 5, the antenna apparatus 500 according to the exemplary embodiment of the present invention comprises a plurality of array antennas a, b, c, d, e, f and g with an antenna configuration that the array antenna arranged in the middle of the plurality of the array antennas a, b, c, d, e, f and g is the longest and the other array antennas become decreasingly shorter from the middle toward both sides.

As illustrated in FIG. 5, the antenna apparatus 500 according to the exemplary embodiment of the present invention may further include a power divider 510 for controlling power to be supplied to each of the plurality of the array antennas a, b, c, d, e, f and g.

The power divider 510 may control power to supply highest power to the array antenna positioned on the middle of the plurality of the array antennas and to reduce power supply decreasingly from the middle toward the sides. As described above, according to the present invention, there are provided a radar apparatus 100 and an antenna apparatus 500 having antenna configuration of arranging a plurality of array antennas capable of concentrating antenna gain on a direction for sensing.

As described above, according to the present invention, there are provided a radar apparatus 100 and an antenna apparatus 500 having antenna configuration of arranging a plurality of array antennas capable of effectively reducing a side lobe level in horizontal direction of the plurality of array antennas.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A radar apparatus comprising:
    an antenna unit having: a long range transmission antenna unit with a plurality of long range transmission array antennas; a short range transmission antenna unit with one or more short range transmission array antenna; and a reception antenna unit with a plurality of reception array antennas; and
    a signal transmission and reception unit for transmitting a signal through at least one of the long range transmission antenna unit and the short range transmission antenna unit, and receiving an echo signal of the transmitted signal reflected off surroundings through the reception antenna unit,
    wherein the long range transmission array antenna arranged in the middle of the plurality of long range transmission array antennas has the longest length and lengths of the other long range transmission array antennas decrease from the middle toward both sides,
    wherein the number of the plurality of the long range transmission array antennas is proportional to a sensing distance of a reference long sensing range, the number of the one or more short range transmission antenna is proportional to a sensing distance of a reference short sensing range, and the number of the plurality of long range transmission array antennas is larger than the number of the one or more short range array antenna.

2. The radar apparatus of claim 1, wherein the long range transmission antenna unit, the short range transmission antenna unit, the reception antenna unit and the signal transmission and reception unit are mounted on one side of a printed circuit board.

3. The radar apparatus of claim 2, wherein a length of a first area on which the long range transmission antenna unit is to be mounted is longer than lengths of a second area on which the short range transmission antenna unit is to be mounted, a third area on which the reception antenna unit is to be mounted and a fourth area on which the signal transmission and reception unit is to be mounted.

4. The radar apparatus of claim 3, further comprising a protective member coupled to the top side of the printed circuit board to cover the signal transmission and reception unit for protecting the signal transmission and reception unit mounted on the printed circuit board.

5. The radar apparatus of claim 4, wherein the protective member has a size to cover only the fourth area of the printed circuit board on which the signal transmission and reception unit is mounted.

6. The radar apparatus of claim 1, further comprising a power divider for controlling power to be supplied to each of the plurality of the long range transmission array antennas and the one or more short range transmission array antenna.

7. A radar apparatus comprising:
an antenna unit having: a long range transmission antenna unit with a plurality of long range transmission array antennas; a short range transmission antenna unit with one or more short range transmission array antenna; and a reception antenna unit with a plurality of reception array antennas; and
a signal transmission and reception unit for transmitting signal through at least one of the long range transmission antenna unit and the short range transmission antenna unit, and receiving echo signal of the transmitted signal reflected off surroundings through the reception antenna unit,
wherein the long range transmission array antenna arranged in the middle of the plurality of long range transmission array antennas is the longest and the other long range transmission array antennas become shorter from the middle toward both sides,
wherein the number of the plurality of the long range transmission array antennas is determined to be inversely proportional to a sensing angle of a predetermined long sensing range, the number of the one or more short range transmission antenna is determined to be inversely proportional to a sensing angle of a predetermined short sensing range, and the number of the plurality of long range transmission array antenna is larger than the number of the one or more short range array antenna.

8. The radar apparatus of claim 7, wherein the long range transmission antenna unit, the short range transmission antenna unit, the reception antenna unit and the signal transmission and reception unit are mounted on one side of a printed circuit board.

9. The radar apparatus of claim 8, wherein a length of a first area on which the long range transmission antenna unit is to be mounted is longer than lengths of a second area on which the short range transmission antenna unit is to be mounted, a third area on which the reception antenna unit is to be mounted and a fourth area on which the signal transmission and reception unit is to be mounted.

10. The radar apparatus of claim 9, further comprising a protective member coupled to the top side of the printed circuit board to cover the signal transmission and reception unit for protecting the signal transmission and reception unit mounted on the printed circuit board.

11. The radar apparatus of claim 10, wherein the protective member has a size to cover only the fourth area of the printed circuit board on which the signal transmission and reception unit is mounted.

12. The radar apparatus of claim 7, further comprising a power divider for controlling power to be supplied to each of the plurality of the long range transmission array antennas and the one or more short range transmission array antenna.

* * * * *